April 23, 1968     R. D. RUMSEY ET AL     3,379,100

HYDRAULIC ROTARY ACTUATOR WITH FAIL-SAFE LOCKING MEANS

Filed July 7, 1965     7 Sheets-Sheet 1

INVENTORS
Rollin Douglas Rumsey
John M. Perhach

BY *Hill, Sherman, Meroni, Gross & Simpson*     ATTORNEYS

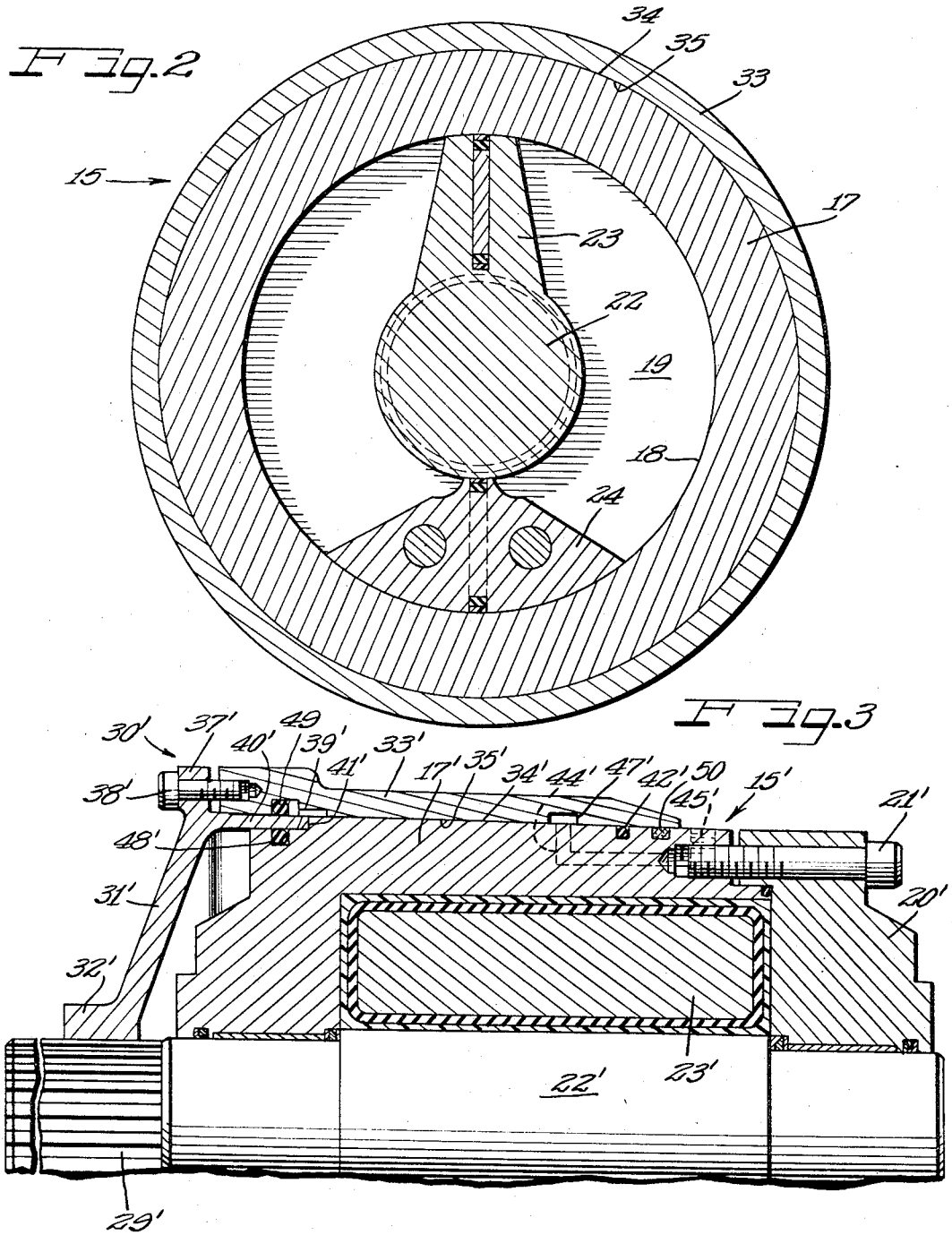

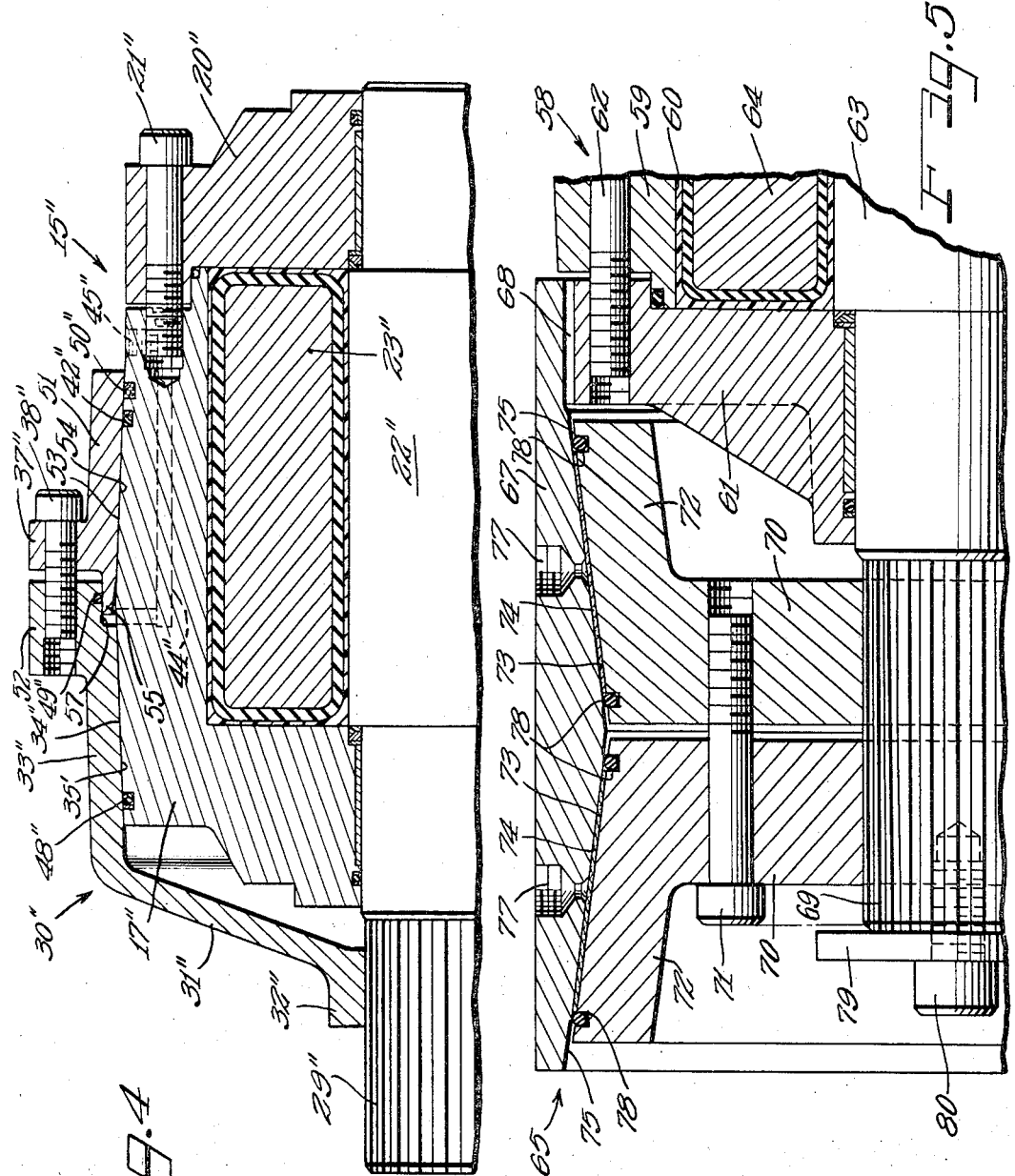

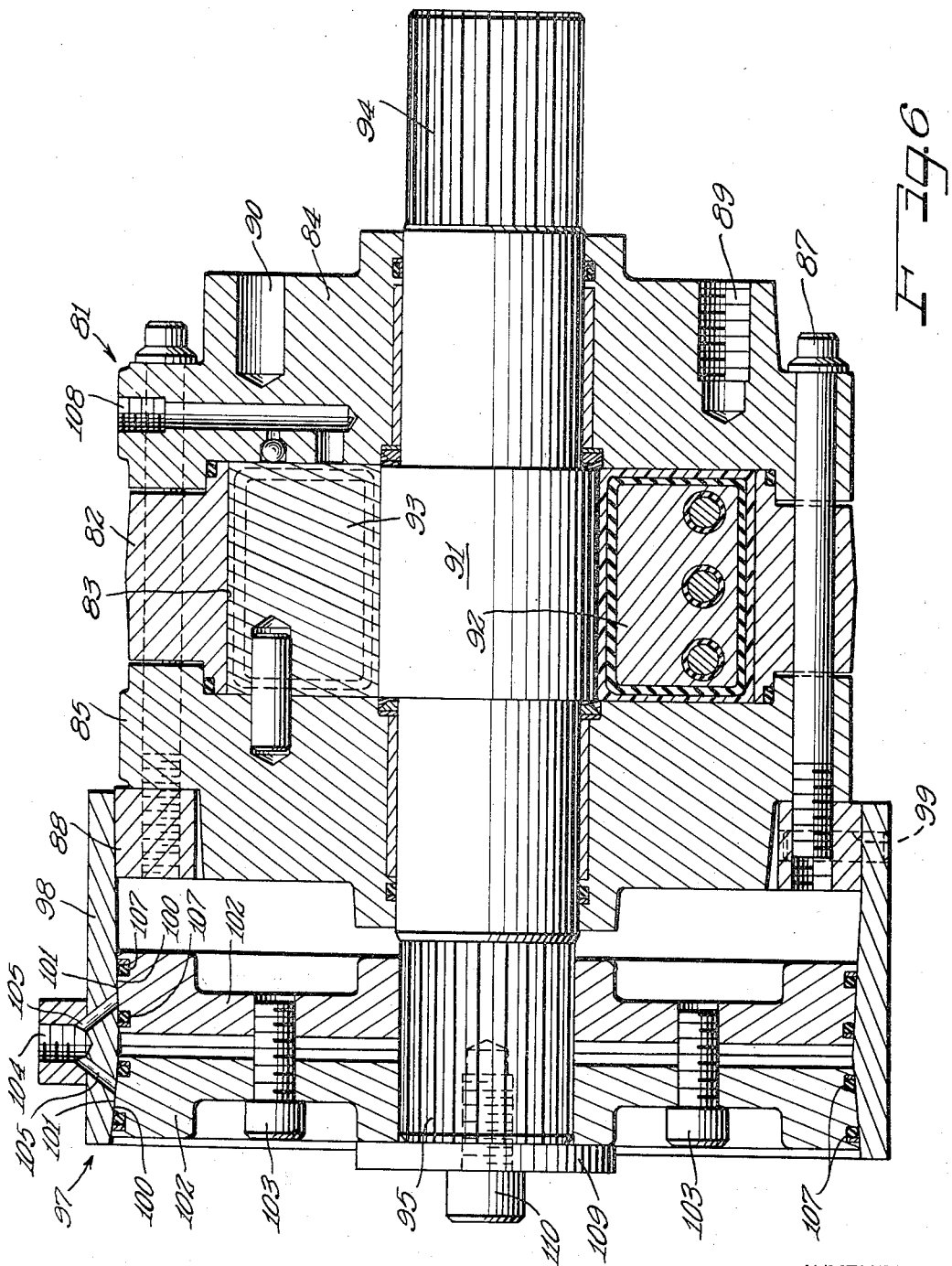

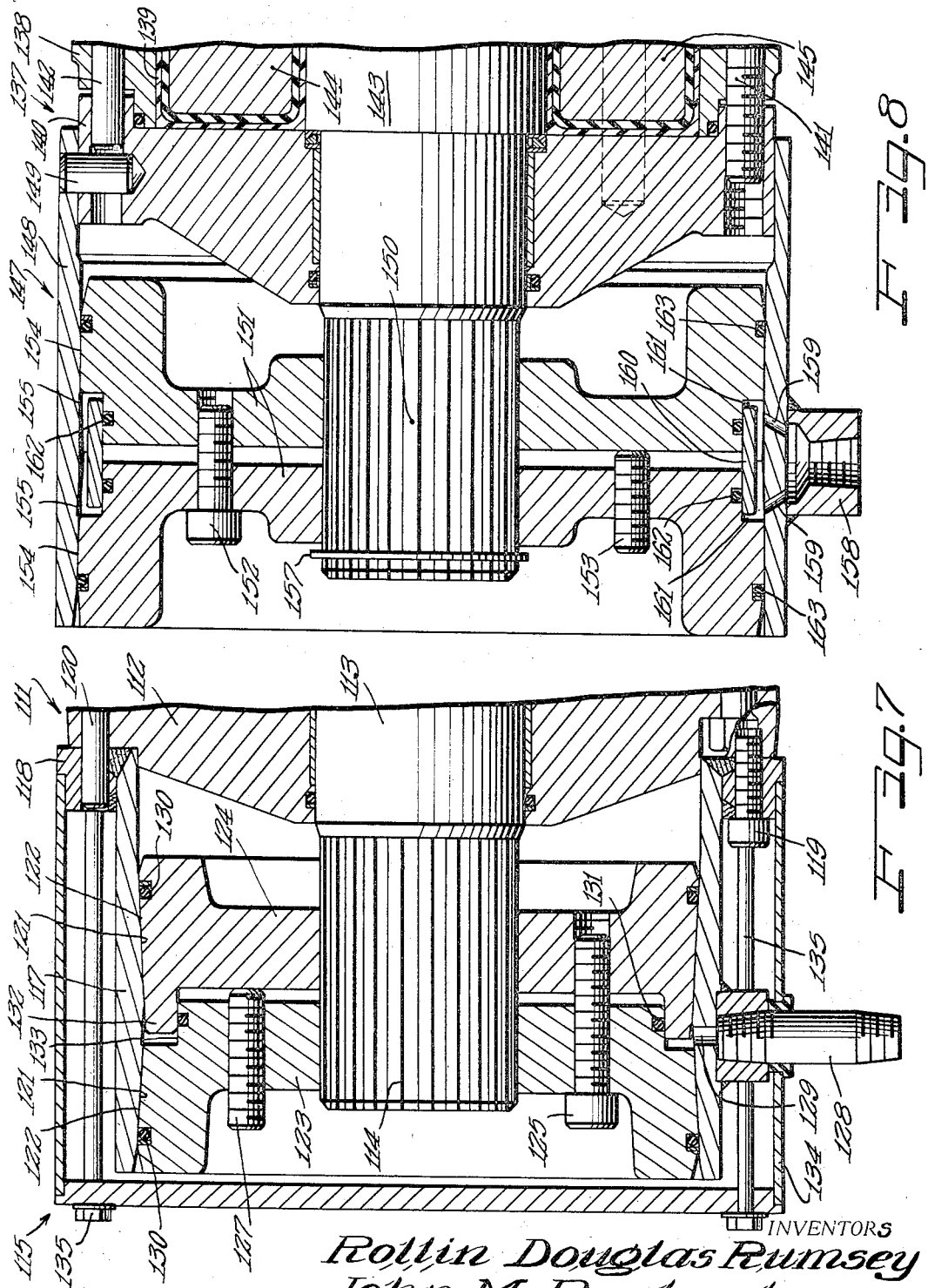

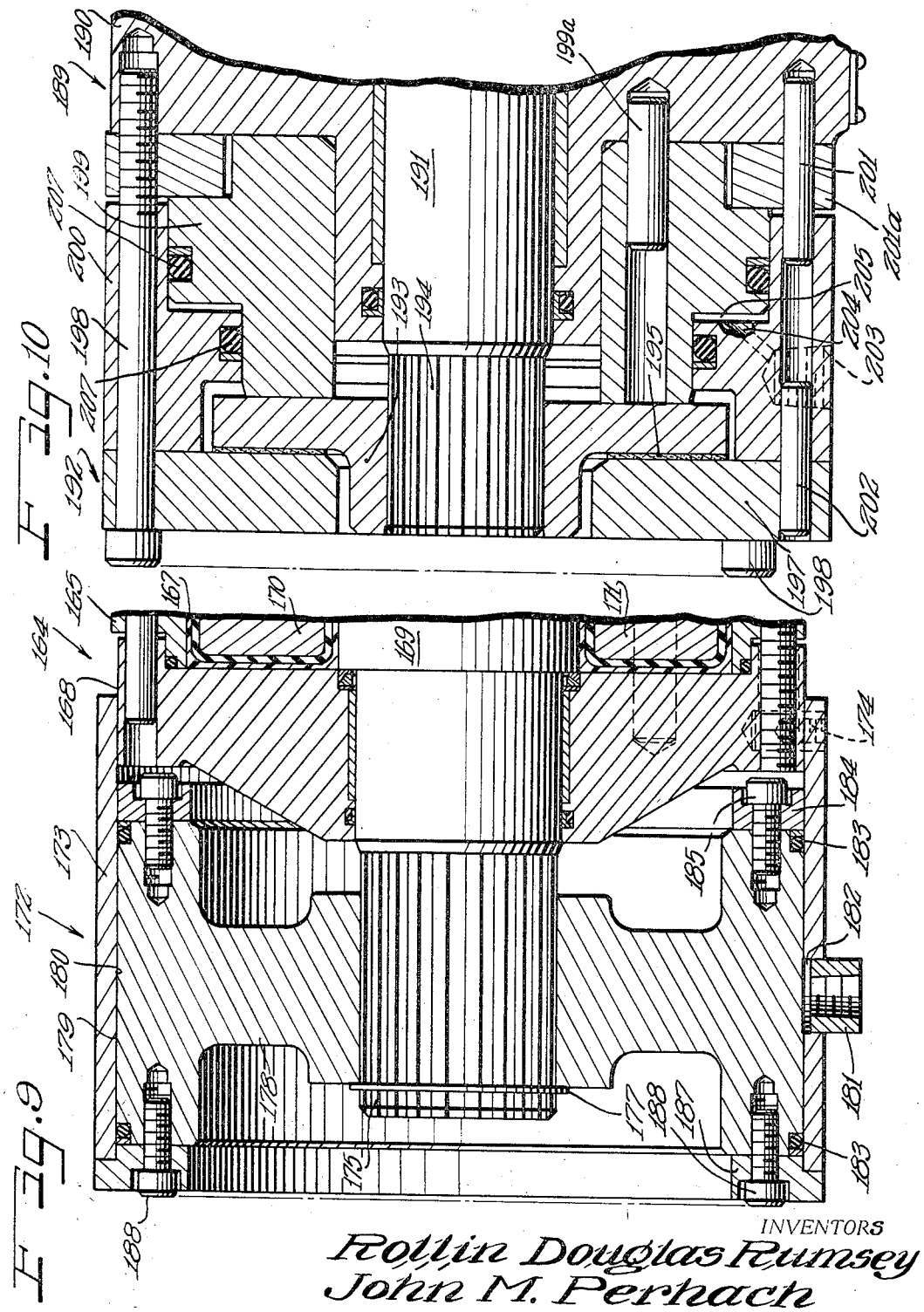

INVENTORS
Rollin Douglas Rumsey
John M. Perhach

ATTORNEYS

United States Patent Office 3,379,100
Patented Apr. 23, 1968

3,379,100
HYDRAULIC ROTARY ACTUATOR WITH FAIL-SAFE LOCKING MEANS
Rollin Douglas Rumsey and John M. Perhach, Buffalo, N.Y., assignors to Houdaille Industries, Inc., Buffalo, N.Y., a corporation of Michigan
Filed July 7, 1965, Ser. No. 470,174
13 Claims. (Cl. 92—27)

ABSTRACT OF THE DISCLOSURE

Several forms of fail-safe locks are provided for rotary hydraulic actuators and comprise opposed normally frictionally lockingly engaged braking surfaces respectively corotatively connected with relatively rotatable members of the actuators. Hydraulic fluid is employed as needed to release the braking surfaces.

---

This invention relates to improvements in braking or locking devices for rotary actuators and more particularly vane type hydraulic rotary actuators, and is more especially directed to means which will avoid shifting or drifting of the relatively moveable parts of such actuators when the hydraulic pressure in the system is discontinued or drops or is maintained static.

Hydraulic rotary actuators are highly useful in numerous practical situations for relatively moving parts of apparatus into selected positions and maintaining relative positional adjustments of the apparatus. For example, this type of actuator is advantageously used for positioning utility truck booms wherein the location of a basket, a drill, derrick, or the like, must be maintained. In rock drills and similar equipment, such actuators are used as boom positioners. In any such use, the actuators are required to maintain adjusted positions of the apparatus frequently for long periods of time, even without dynamic fluid pressure in the system, such as when the operating pump is stopped. Frequently, such static holding condition prevails during transportation of the equipment from one place to another. It is especially important to maintain complete locking against relative movement of the actuator controlled apparatus of such equipment when a person is in or on the device for any reason such as in making changes, repairs, or manual adjustments of any sort.

Accordingly, it is an important object of the present invention to provide new and improved rotary hydraulic actuator brake or locking means which are positive and reliable in operation, are responsive to dynamic fluid pressure for release or unlocking and are automatically responsive to negative hydraulic pressure or hydraulic pressure failure to lock and hold the relatively rotary parts of the actuator against movement.

Another object of the invention is to provide a new and improved rotary hydraulic actuator brake device which is spring loaded so as to be an effective fail-safe device.

A further object of the invention is to provide a reliable, low-cost fail-safe brake device for vane type rotary hydraulic actuators.

Still another object of the invention is to provide new and improved brake means which are normally in a braking or locked condition but are releasable by means of hydraulic pressure.

Other objects, features and advantages of the present invention will be readily apparent from the following detailed description of certain preferred embodiments thereof taken in conjunction with the accompanying drawings in which:

FIGURE 2 is a transverse sectional view taken substantially on the line II—II of FIGURE 1;

FIGURE 3 is a longitudinal sectional elevational view similar to FIGURE 1 but showing a modification in the brake means;

FIGURE 4 is a longitudinal sectional elevational view similar to FIGURE 3 but showing another modification;

FIGURE 5 is a longitudinal sectional elevational view showing a further modification of the brake means;

FIGURE 6 is a longitudinal sectional elevational view through a modified form of the actuator showing still another modification of the brake means;

FIGURE 7 is a longitudinal sectional elevational view depicting yet another modification of the brake means;

FIGURE 8 is a longitudinal sectional elevational view showing a yet further modification of the brake means;

FIGURE 9 is a longitudinal sectional elevational view showing a yet further modification of the brake means;

FIGURE 10 is a similar view depicting still another modification of the brake means;

Figure 1:
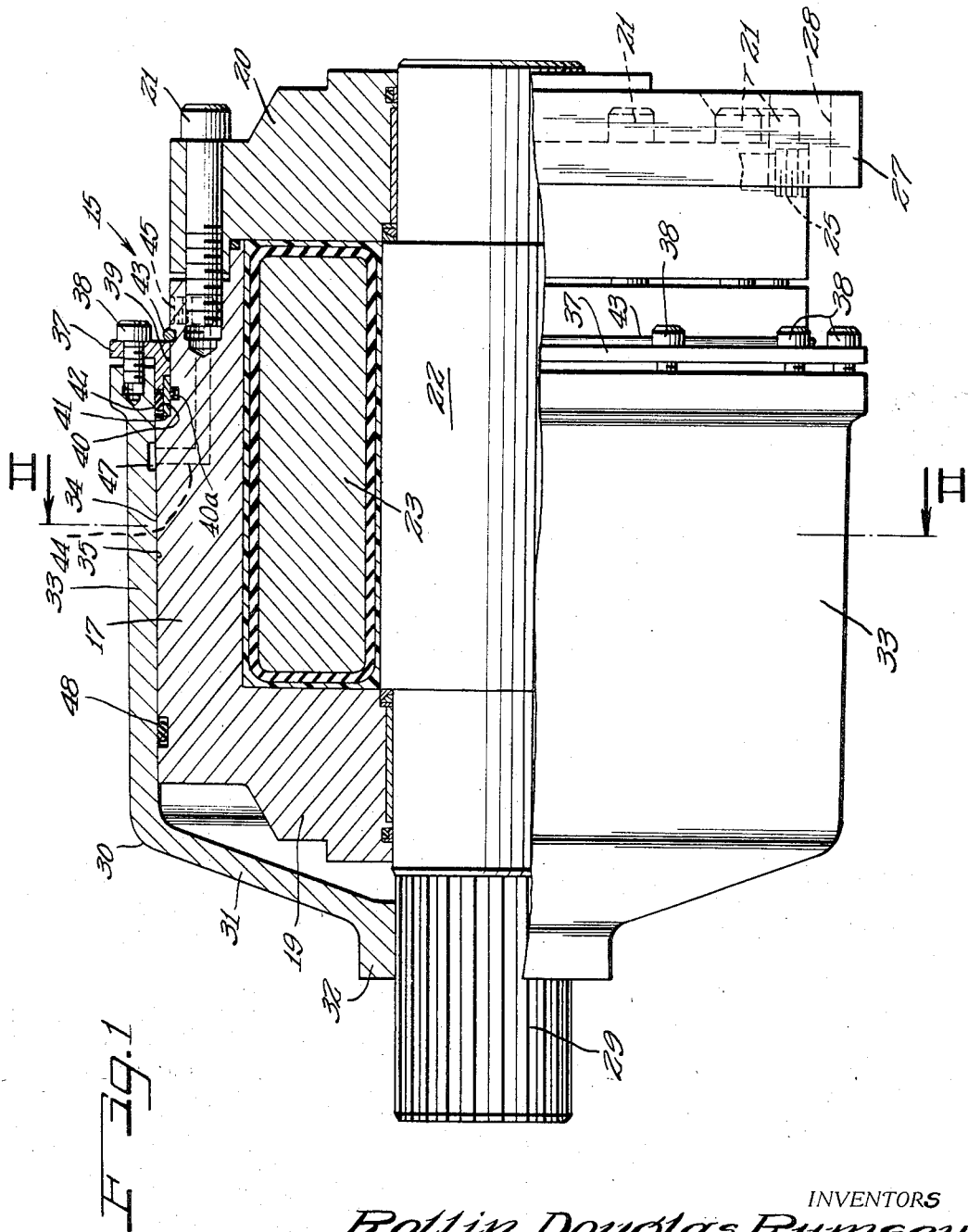
FIGURE 1 is a longitudinal sectional elevational view of a rotary hydraulic actuator embodying features of the invention.

On reference to FIGURES 1 and 2, a typical rotary vane hydraulic actuator 15 of the heavy duty type comprises a generally cup-shaped body member 17 defining theerin a cylindrical working chamber 18 substantially closed at one end by an integral end closure head 19 on the body. Mounted on the opposite end of the body is a separable end closure member 20 which is secured in place by means of screws 21. Journalled through respectively the end closure portion 19 of the housing and the end closure member 20 are opposite end portions of a wing shaft 22 located coaxially within the working chamber 18 and having at least one vane 23 cooperating with the wall defining the working chamber and an abutment 24 mounted in the chamber to divide the chamber into sub-chambers at opposite sides of the vane. By alternately introducing hydraulic pressure fluid into one of the subchambers and bleeding it from the other of the sub-chambers, oscillatory movements are effected selectively of the wing shaft 22 relative to the housing. Introduction and bleed-off of the hydraulic fluid is adapted to be effected in suitable manner through respective ports 25 adapted to be connected into the hydraulic system of the equipment with which the actuator is used. In such equipment, the actuator housing is attached to one of relatively moveable members of apparatus of the equipment, as by means of attachment flange or ear means 27 on the end closure member 20 which may be provided with bolt holes 28 for the purpose. Attachment of the wing shaft 22 to the other of the relatively moveable members to be actuated may be effected through a splined end portion 29 of the wing shaft, such end portion in this instance extending a suitable distance outwardly beyond the end closure portion 19 of the housing member 17.

During non-operating periods, the wing shaft 22 is held perfectly stationary relative to the actuator housing by positive locking brake means normally acting to maintain the locked condition and releasable in response to hydraulic pressure to enable relative rotary or oscillatory working action of the housing and wing shaft. To this end, a generally cup-shaped brake member 30 is provided having an end flange portion 31 including a splined hub 32 engaged upon the splined portion 29 of the wing shaft whereby the brake member is corotatively coupled to the wing shaft. Braking engagement of the member 30 with the housing is effected by means of a tubular body portion 33 of the brake member 30 frictionally grippingly encompassing a major portion of the length of the housing body member 17. Through this arrangement, the brake member 30, in effect, provides a brake drum coacting with the housing body 17 serving as a continuous circular brake shoe.

If preferred, the braking interengagement between the outer perimeter shoe surface of the housing body 17 and the brake drum portion 33 may be an interference fit. Such interference fit, however, requires quite close tolerance control of the opposing braking surfaces. To avoid such tolerance problem, a low-pitch frusto-conical outer peripheral brake shoe surface 34 is provided on the housing 17 and the brake drum portion 33 is provided with a complementary frusto-conically pitched braking surface 35 which is sufficiently longer than the shoe surface 34 to enable longitudinal relative drawing-up adjustment of the braking surfaces to the holding force desired and compensating for variations in tolerances, and wear.

A desirable means for adjustably drawing the brake drum onto the brake shoe comprises a draw-up ring 37 of generally L-shape cross section having a radial flange opposing the end of the brake drum portion 33 and attached thereto by an annular series of draw-up screws 38. Anchoring of the draw-up ring on the body 17 is effected by engagement of its inner perimeter about a reduced diameter annular portion 39 of the housing body which underlies the end portion of the drum flange 33 to accommodate the axial flange portion of the draw-up ring thrusting against a sleeve bearing 40 abutting a stop shoulder 41 at the inner end of the reduced diameter portion 39 and defining with the shoulder and the adjacent end of the draw-up ring flange a seal groove within which is mounted a resilient sealing ring 42 such as an O-ring. Locking of the ring 37 against displacement axially away from the abutment and bearing 40 is effected by means comprising a snap ring 43 seated in a suitable groove in the inset perimeter 39 of the housing body. Through this ararngement, the brake drum flange 33 is adapted to be adjusted by drawing it up through the screws 38 to afford the most advantageous gripping relationship between the braking surfaces 34 and 35 for any particular installation.

Release of the brake is effected hydraulically by introducing pressure between the braking surfaces 34 and 35 through a suitable passage 44 in the actuator body 17. At its outer end, the passage 44 has an inlet 45 to communicate with a hydraulic pressure source such a conduit leading from the hydraulic system of the equipment with which the actuator is used. At its opposite, inner end, the passage 44 communicates with an annular distribution groove 47 in one of the braking surfaces inwardly beyond the seal 42. Hydraulic pressure thereby introduced between the braking surfaces 34 and 35, and confined between the seal 42 and an annular, preferably O-ring, seal 48 adjacent to the opposite end of the braking surfaces, causes sufficient expansion of the brake drum flange 33 to release the brake for rotary relative movements of the actuator housing and the wing shaft, with the brake drum member 30 and the actuator housing member 17 correspondingly relatively turning. In this action, the hydraulil fluid creating the separating, hoop expansion pressure between the braking surfaces 34 and 35 also serves as lubricant. Since the inside diameter of the seal 42 and the outside diameter of the seal 48 are the same, the brake drum sleeve 33 is in hydraulic balance during application of brake-releasing pressure, and axial thrust in either direction and resulting wear are thus avoided. A seal 40a prevents leakage between the bearing ring 40 and the housing member 17.

By virtue of the adjustable holding force attainable between the braking surfaces 34 and 35 through the adjusting screws 38, accommodation to the available and desirable hydraulic release pressure can be readily accommodated. Hence, the actuator and the same brake can be utilized in various installations wherein the system pressures differ, because if relatively low pressures are employed, the brake can be set to release at such low-system pressure. In such instance, since the actuator output torque would be low, the brake holding torque would be proportionately lower. On the other hand, in a high pressure system, correspondingly higher brake holding torque is attained by adjustment of the holding pressure, and correspondingly, the release pressure required, by adjustment through the screws 38.

In FIGURE 3, the principles of the invention are embodied in and in association with a rotary hydraulic actuator 15' which may be substantially the same as the hydraulic actuator 15 and for brevity, description of the structure and function of the several elements will not be repeated, but the description already given for such elements hereinbefore is here incorporated by reference and will be understood to apply equally to this modification.

While the brake 30' functions the same as the brake 30, an arrangement is shown, which for some purposes, may be preferred. In this construction, the end flange 31' of the brake drum with its hub 32' splined on the shaft end portion 29' is constructed as a separate piece from the tubular brake drum flange 33', with the draw-up ring 37' being an integral annular radial flange on the end flange 31' opposing the adjacent end of the separate brake drum sleeve flange 33' and connected therewith through air annular series of draw-up screws 38'. To relieve the screws 38' from shear loads connecting dowels (not shown) may alternate with at least some of the screws 38'. An integral annular flange 40' on the end flange 31' of the brake drum assembly provides a bearing riding in a reduced diameter annular, inset groove 39' within the adjacent portion of the perimeter of the body 17'. In this embodiment, the opposed braking surfaces 34' and 35', on respectively the body 17' and the brake drum sleeve 33', are tapered frusto-conically toward largest diameter adjacent the connected ends of the brake drum members. Thereby, drawing up on the screws 38' effects the desired braking compression force between the braking surfaces 34' and 35', the end of the bearing flange 40' thrusting against the stop shoulder 41'.

Brake releasing pressure by hydraulic fluid introduced between the braking surfaces 34' and 35' through the passage 44' release the brake in the manner previously described. Hydraulically balanced sealing against leakage of the brake releasing fluid is desidably effected by means such as dynamic O-ring seals 42' and 48' at their respectively opposite ends of the pressure release area and a static O-ring seal 49 in the joint between the brake drum sleeve 33' and the bearing and thrust flange 40'. Desirably, a felt oiler or oil seal 50 is provided between the body 17' and the free end portion of the brake drum sleeve 33' outwardly from the dynamic seal 42'.

The embodiment of the invention depicted in FIGURE 4 comprises a rotary hydraulic actuator of substantially the same construction as that shown in and described in relation to FIGURE 1 and therefore double primed reference numerals identify corresponding parts, and for a description thereof, reference is invited to FIGURE 1, for purposes of brevity. In this form, the brake drum 30'' functions the same as and is released substantially the same as the brake 30 in the form of FIGURE 1, but comprises a two-part construction of the braking sleeve portion thereof. For this purpose, the brake drum 30'' has the end flange 31'' integral with the adjacent portion of the brake drum sleeve 33'' of substantially shorter length than in the embodiment of FIGURE 1 and comprising about one-half of the effective length of the sleeve, while the remaining length of the sleeve is provided by a brake sleeve flange portion 51, in this instance comprising an integral part of the draw-up ring 37'' which is attached by the draw-up screws 38'' in draw-up relation to an annular radial attachment flange portion 52 on the adjacent end of the sleeve portion 33".

Braking compression force between the two-part brake sleeve and the actuator body 17" is enabled by the provision of opposed braking surfaces 34" and 35" on respectively the body and the brake sleeve portion 33" which are convergently frusto-conical with respect to corresponding opposed braking surfaces 53 and 54 on respectively the body 17" and the brake sleeve portion 51. Through this arrangement, the largest diameter of the braking surfaces, at juncture of the frusto-conical surface areas 34" and 53 on the perimeter of the actuator housing 17", is located adjacent to juncture of the two draw-up parts of the brake drum sleeve assembly, so that by drawing the two sleeve portions toward one another by means of the screws 38", the desired braking compression pressure or force can be attained.

Brake-releasing hydraulic pressure is transmitted by the hydraulic pressure passage 44" between the braking surfaces at a point adjacent juncture of the brake drum sleeve portions. Leakage is avoided at the opposite ends of the brake shoe surface area of the housing 17" by the respective seals 42" and 48". Further, a sliding joint between the brake sleeve portions 33" and 51 sealed by the ring 49" is afforded by a joint flange 55 projecting from the sleeve 51 lappingly into a rabbet groove 57 in the inner perimeter of the draw-up flange portion 52.

Reference is now invited to the embodiment of FIGURE 5 in which a hydraulic rotary actuator 58 is depicted in an abbreviated form but will be understood to embody such other features as may be desired, as for example, selected from the more comprehensive disclosures of FIGURES 1 and 6. As shown, the actuator 58 includes a rugged housing having a body member 59 providing a working chamber 60 closed at one end by an end member 61 secured to the housing member 59 by means such as screws or bolts 62. Journaled through the housing is a wing shaft 63 having a vane 64 operative within the working chamber 60 in cooperation with the usual abutment in response to hydraulic fluid pressure to effect selective relative oscillations of the housing and wing shaft.

Normally, the housing and wing shaft of the actuator 58 are lockingly held against relative rotary movement by a hydraulically releasable brake 65. In this instance, the brake 65 comprises a brake drum sleeve 67 which is secured corotatively with the actuator housing as by means of a splined connection 68 with the perimeter of the end member 61 and extends in coaxial space relation about a splined end portion 69 projecting outwardly from the end member. Brake shoe means are mounted corotatively with the shaft 63 on the splined portion 69 and comprise a pair of relatively adjustably related similar complementary brake shoe disk members 70 secured together by a series of draw-up screws or bolts 71. Each of the brake shoe members 70 has a brake shoe flange 72 which operatively opposes the inner surface of the brake drum sleeve 67. Adjustable locking force braking engagement of the shoe flanges 72 with the brake drum sleeve 67 is enabled by the provision of tapered generally frusto-conical inwardly convergent respective brake surfaces 73 on the brake shoe flanges 72, desirably faced with friction brake lining 74 and brakingly opposing complementary tapered inwardly converging braking surfaces 75 on the inside of the brake drum sleeve 67. Through this arrangement, by having the brake shoe disk members 70 so related as normally to be in spaced relation, drawing-up of the bolts 71 effects the desired normal brake locked gripping interengagement of the braking surfaces.

Hydraulic release of the brake 65 is enabled by attachment of siutable hydraulic pressure conduits to hydraulic passage or port inlets 77 communicating with the brake surfaces 75 of the brake drum sleeve. Hydraulic pressure thus introduced between the braking surfaces, and retained against leakage by respective seals 78 located at the opposite ends of the braking surfaces 73 of the brake shoes, effects sufficient hoop expansion of the brake drum sleeve 67 to release the brake and enable relative rotary or oscillatory adjustments or movements of the actuator housing and wing shaft. Removal of the brake assembly 65 is enabled by removal of a retaining disk washer 79 of larger diameter than, and secured as by means of a screw or bolt 80 to the end of the splined portion 69 of the shaft and opposing unintentional displacement of the brake shoes 70 from the splined shaft portion.

In the form of the invention depicted in FIGURE 6, a rotary vane hydraulic actuator 81 comprises a stacked housing including a ring body 82 defining a working chamber 83 closed at one end by an end member 84 and at its opposite end by an end member 85. Securing the housing members in stacked relation is a series of long bolts 87 extending through the margins of the members, with the heads of the bolts thrusting against the end member 84 and the opposite, threaded ends of the bolts secured into a clamping ring 88 which clampingly thrusts against the end member 85. Means for securing the housing of the actuator 81 to one of a pair of members in apparatus to be motivated by the actuator comprise a series of outwardly axially opening threaded screw sockets 89 and dowel pin sockets 90 in the end member 84.

Journalled through the actuator housing and with the end members 84 and 85 serving as bearings therefor, is a wing shaft 91 having at least one vane 92 thereon within the working chamber 83 and cooperating with an abutment 93 doweled in the chamber. Attachment of the wing shaft 91 to one of the members to be relatively moved by the actuator is effected as by means of a splined end portion 94 of the shaft projecting outwardly from the end member 84. At its opposite end, the wing shaft 91 is provided with a similar splined end portion 95 projecting outwardly beyond the end member 85 and adapted to coact with a locking brake assembly 97 by which the housing and the wing shaft of the actuator are normally held against relative rotation.

As will be observed, the brake 97 is on the order of the brake 65 and includes a brake drum sleeve 98 which is secured corotatively at one end portion to the housing of the actuator. In this instance, the brake drum sleeve 98 is secured detachably to and about the clamping ring 88, being held fixedly thereon as by means of radial screws 99. From the clamping ring 88, the brake drum sleeve 98 extends axially into spaced relation about the wing shaft end portion 95 and affords inwardly convergently related frusto-conical inner braking surfaces 100 which have their smallest diameter at convergence, similarly as the braking surfaces on the brake drum sleeve of the brake 65. Opposing the braking surfaces 100 are respective complementary inwardly convergently tapered braking surfaces 101 on the outer perimeters of substantially identical opposed spaced complementary brake shoe disk members 102 which are splined on the splined end portion 95 of the wing shaft and are arranged to be drawn-up into normal locking brake engagement of the braking surfaces by means of screws or bolts 103. Thereby, the actuator housing and the wing shaft are normally held against relative rotation.

Unlocking or release of the brake 97 is arranged to be effected by introduction of hydraulic pressure fluid through a nipple 104 on the brake drum sleeve 98 communicating through branch passages 105 with the braking surfaces 101 between respective spaced seals 107 in each of the braking surfaces 101. Thereby, hoop expansion of the brake drum sleeve 98 unlocks the brake and enables relative rotary adjustment of the wing shaft and the housing of the actuator.

Hydraulic fluid for operating the actuator 81 is adapted to be introduced into the working chamber 83 through one or more hydraulic passages 108 provided in the end member 84.

Safety retaining means for the brake 97 may be in the form of a retaining washer disk 109 of larger diameter than the splined end portion 95 of the wing shaft and secured to the end thereof as by means of a screw 110.

In the embodiment of the invention according to FIGURE 7, a rotary vane hydraulic actuator 111 is provided including a housing having an end portion 112 and journalling a wing shaft 113 having a splined end portion 114 projecting outwardly relative to the end portion 112. Normally locking the housing and wing shaft against relative rotation is a locking brake 115 comprising a brake drum sleeve 117 mounted corotatively on the actuator housing through a mounting ring 118 secured as by welding to the inner end of the sleeve and attached to the end member 112 of the actuator housing as by means of screws 119 and dowels 120.

On its inner surface, the brake drum sleeve 117 is in suitable spaced concentric relation about the shaft end portion 114 and has inwardly convergently tapered frusto-conical brake surfaces 121 meeting at their smallest diameter and opposing in brake locking gripping relation complementary frusto-conically inwardly convergently tapered brake surfaces 122 on the outer perimeters of complementary brake shoe disk members 123 and 124 which are splined on the shaft portion 114 in spaced relation to one another and secured in braking relation by draw-up bolts or screws 125. For definitely fixing the braking adjustment of the brake shoe members 123 and 124, one or more spacer screws 127 may be provided threaded through the outermost brake shoe disk 123 and thrusting against the opposing axial surface of the brake shoe disk member 124.

Release of the brake 115 is arranged to be effected by hydraulic fluid pressure introduced through a nipple 128 secured to the brake drum sleeve 117 and communicating through a passage 129 with the opposed braking surfaces 121 and 122 for hoop expansion of the brake drum sleeve. Leakage of the brake releasing hydraulic fluid is prevented by dynamic seals 130 in the respective outer end portions of the brake surfaces 122, and a static seal 131 in the joint provided between an annular tongue flange 132 projecting from the brake shoe disk 124 into a complementary rabbet socket groove 133 in the inner margin of the brake surface perimeter of the brake shoe disk member 123.

For protectively enclosing the locking brake 115, a generally cup-shaped housing 134 is provided having its edge seated on the attachment ring 118 and removably secured thereto as by means of bolts 135.

As depicted in FIGURE 8, the invention is embodied in a rotary vane hydraulic actuator 137 comprising a housing including a body ring member 138 defining a working chamber 139 closed at one end by an end member 140 secured together by screws or bolts 141 and dowels 142. Journalled through the housing is a wing shaft 143 having at least one vane 144 cooperative within the working chamber 139 with an abutment 145 responsive to hydraulic fluid pressure to effect relative rotary movements of the housing and wing shaft.

A locking brake 147 normally holds the housing and wing shaft of the actuator 137 firmly against relative rotation. This brake comprises a brake drum sleeve 148 having one end portion embracing and secured to the perimeter of the end member 140 by suitable means such as pins or dowels 149. From the end member 140, the brake drum sleeve 148 extends axially into spaced coaxial relation about a splined end portion 150 of the wing shaft 143 extending outwardly beyond the end member 140 and having splined thereon a pair of similar, complementary brake shoe disk members 151 which are secured together in spaced relation for optimum lock braking by means of screws 152, with set screws 153 maintaining the spaced adjusted braking relationship.

At their outer braking perimeters, the brake shoe disk members 151 have respective inwardly convergently tapered annular braking surfaces 154 which oppose complementary inwardly convergently frusto-conically tapered braking surfaces 155 on the inner diameter of the brake drum sleeve 148 and joining at their minimum diameter. Retention of the brake shoe assembly on the wing shaft is effected as by means of a snap ring 157.

Release of the brake is effected by hydraulic fluid pressure introduced through a nipple connection boss 158 communicating through respective passages 159 through the wall of the brake drum sleeve 148 with the tapered braking surfaces 155. Leakage of the brake-releasing pressure fluid is avoided by a bridging sleeve 160 seated across the gap between the brake shoe disks within complementary adjoining rabbet grooves 161 in the inner margins of the outer perimeters of the brake shoes, with static sealing rings 162 in the joint between the sleeve and the shoes. At the opposite ends of the braking surfaces 154, dynamic sealing rings 163 prevent leakage.. Through this arrangement, efficient hoop expansion release of the brake may be effected for relative rotary adjustments of the housing and wing shaft of the actuator 137.

In the embodiment of FIGURE 9, a rotary vane hydraulic actuator 164 comprises a housing ring 165 providing a working chamber 167 closed at one end by an end closure member 168. Journalled through the housing is a wing shaft 169 having thereon a vane 170 cooperative in the working chamber 167 with an abutment 171 for response to hydraulic pressure to effect relative rotary adjustments of the housing and the wing shaft.

For normally locking the housing and wing shaft of the actuator 164 against relative rotation, a hydraulic pressure releasable locking brake 172 is provided comprising a cylindrical brake drum sleeve 173 which is removably secured to the actuator housing by having one end portion of the sleeve embracing the outer perimeter of the end member 168 and releasably attached as by means of screws 174. From its attachment to the end member, the brake drum sleeve 173 extends axially into spaced coaxial relation about a splined end portion 175 on the shaft 169 projecting outwardly from the end member 168 of the actuator housing. Splined on the shaft portion 175 and retained as by means of a snap ring 177 is a one-piece brake shoe disk 178 having its outer perimeter provided with a cylindrical braking surface 179 which is normally in interference fit within a cylindrical inner braking surface 180 of the brake drum sleeve 173. As a result, the actuator housing and the wing shaft 169 are normally locked against relative rotation.

To release the brake 172, hydraulic pressure fluid is adapted to be introduced between the braking surfaces 179 and 180 through a nipple boss 181 mounted on the sleeve 173 and communicating through a passage or port 182 therethrough. Brake release is thereby effected by hydraulically hoop expanding the brake drum sleeve 173, whereupon relative rotary or oscillatory adjustments of the actuator housing and the wing shaft 169 can be effected.

Leakage of the brake-releasing hydraulic fluid from the interface area of the braking surfaces is prevented by dynamic ring seals 183 mounted in the opposite end portions of the brake shoe braking surface 179. For securing the inner of the sealing ring assemblies 183, a retaining ring 184 is secured to the inner side of the brake shoe member as by means of securing screws 185. Retention of the outer of the dynamic sealing assemblies 183 is by means of a retaining ring 187 secured by means of screws 188. This retaining ring 187 also laps over the outer end of the brake drum sleeve 173 to protect the dynamically sealed joint from contamination by foreign substances.

In the modification of FIGURE 10, a rotary vane hydraulic actuator 189 includes a housing 190 journalling a wing shaft 191 and provided with a hydraulically releasable normally locking brake 192. In this instance, the brake 192 includes a brake drum assembly carried by the actuator housing 190 and constructed and arranged for axial spring loading rather than hoop spring loading against the brake shoe structure. To this end, the brake shoe structure is in the form of a brake disk 193 which is keyed to the wing shaft 191, conveniently on a splined end portion 194 of the shaft projecting outwardly from the housing 190.

On at least one of its faces, herein the outer face, the brake disk 193 carries a friction brake liner 195 which normally lockingly grippingly engages an opposing brake surface on a brake plate 197 which is secured corotatively on the actuator housing and is adjustably spring loaded toward the brake disk 193 by means of screws or bolts 198 having their heads thrusting against the plate and threaded into the adjacent end of the housing. Opposing the inner face of the brake disk 193 is a rigid adapter member 199 seated on the housing and secured corotatively therewith as by means of dowels 199a. Through this arrangement, the brake disk 193 is normally lockingly gripped between the brake plate 197 and the adapter 199 and the wing shaft 191 thereby positively held against rotation relative to the housing of the actuator 189.

Means for hydraulically releasing the brake 192 comprise a release plunger ring 200 held in the assembly by the bolts 198 corotative with the housing of the actuator, aided by dowels 201 which also extend through a ring 201a abutting the end of the housing. At its opposite end, the release plunger 200 is secured in corotative relation to the brake plate 197 by dowels 202, in addition to the bolts 198.

Brake releasing thrust of the plunger 200 toward the brake plate 197 is hydraulically effected by introducing through a suitable inlet 203 in the perimeter of the release plunger hydraulic pressure fluid which communicates by way of a passage 204 with a narrow annular pressure chamber 205 between opposed axially facing pressure surfaces on the adapter member 199 and the plunger 200 for uniformly thrusting the plunger outwardly to effect axially outward springing release of the brake plate 197 relative to the brake disk 193 by slight stretching of the long securing bolts 198. While the brake releasing pressure is maintained, relative rotary movements of the housing 190 and the shaft 191 may be effected. Leakage of the hydraulic pressure fluid from the brake release chamber 205 is avoided by dynamic sealing ring assemblies 207 located in the axially extending opposing surfaces of the members 199 and 200 at opposite sides of the pressure chamber. It will be observed that the plunger 200 of the brake drum assembly is sufficiently shorter than the normal distance between the brake plate 107 and the ring 201a to permit substantial drawing-up adjustment of the brake plate for adjusting the spring load exerted against the brake disk 193.

Figure 11:
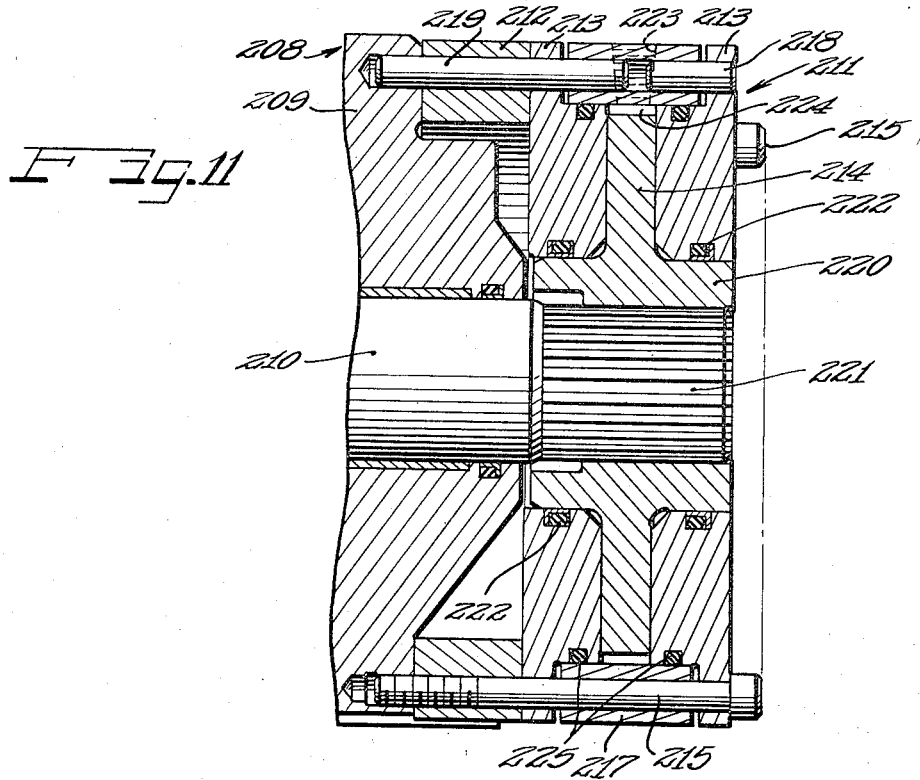
FIGURE 11 is a longitudinal sectional elevational view showing details of an additional modification of the brake means.

Another example of axial spring loading is represented in the embodiment of FIGURE 11 in which a rotary vane actuator 208 including a housing 209 journalling a wing shaft 210 has a hydraulic pressure releasable locking brake 211. In this arrangement, the brake drum structure comprises a spacer ring 212 seating against the end of the housing, a pair of opposed, preferably identical, complementary heavy spring ring gripper disks 213 normally lockingly clamped onto a brake disk 214 with adjustable pressure exerted by means of attachment screws or bolts 215 extending through the outer margins of the gripper disks and a closure ring 217 about the gap between the spring disks and then extending through the spacer ring and threaded into the end of the housing 209. Dowels 218 and 219 cooperate with the bolts 215 and assist in maintaining the brake drum structure corotative with the housing 209.

Corotational attachment of the brake disk 214 to the wing shaft 210 is by means of a flanged hub 220 on the inner perimeter of the brake disk keyed onto the wing shaft as onto a splined end portion 221 thereof. Axially opposite portions of the hub 220 freely rotatably oppose the inner edges of the spring disks 213, and respective dynamic ring seals 222 seal the joints against pressure fluid leakage.

For releasing the brake 211, hydraulic pressure fluid is introduced thereinto through an inlet 223 which extends through the closure ring 217 and communicates with a fluid distribution chamber space 224 about the perimeter of the brake disk 214 whereby the pressure fluid is uniformly distributed to act between the opposing brake disk shoe and brake drum braking surfaces. Static ring seals 225 prevent hydraulic fluid leakage through the joints between the brake drum disks 213 and the closure ring 217. Through this arrangement, hydraulic pressure fluid, sufficient to overcome the adjusted spring pressure effected by means of the draw-up bolts 215, causes the brake drum disks 213 to spread apart sufficiently to release the brake disk 214 for relative rotary movement of the housing 209 and the wing shaft 210. As will be observed, the radially outer margins of the brake drum disks 213 are of substantially thinner section than the brake surface portions of such disks as afforded by insetting of such margins to accommodate the closure ring 217. This facilitates the slight resilient yielding responsive to the brake releasing hydraulic pressure, since the inner of the brake drum disks 213 is mounted in cantilever fashion on the brake drum spacer ring 212, and the outer of the disks 213 has its thinner outer marginal flange engaged by the draw-up bolts 215.

Figure 12:
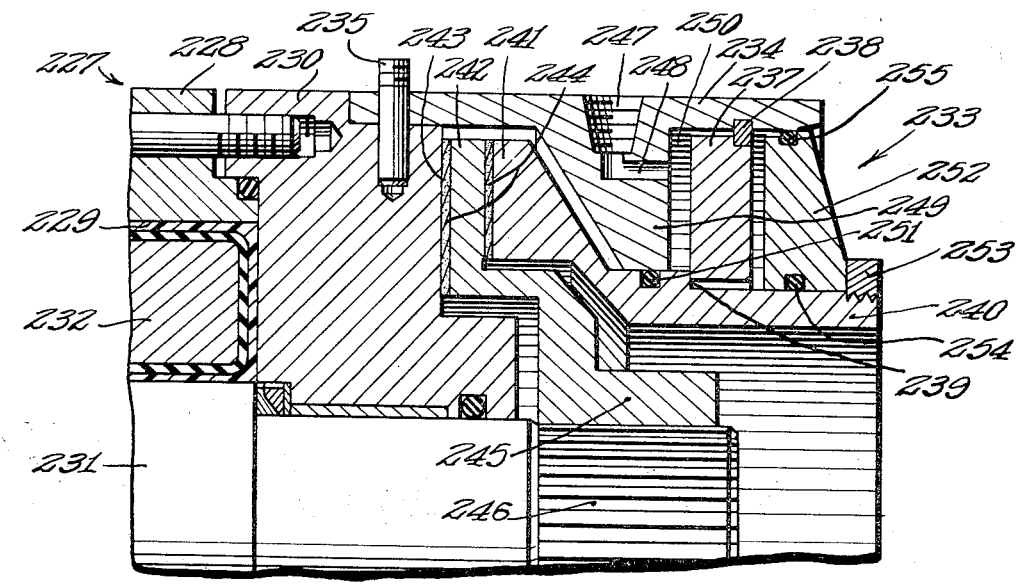
FIGURE 12 is a longitudinal sectional elevational view depicting a yet further modification.

In a further embodiment of axial application of brake pressure as shown in FIG. 12, a rotary vane hydraulic actuator 227 comprises a housing including a body 228 defining a working chamber 229 closed at one end by an end member 230 and journalling a wing shaft 231 having a vane 232 cooperative in the working chamber 229 with the usual abutment to respond to hydraulic fluid pressure for relatively rotating the housing and wing shaft.

Normally, relative rotation of the housing and wing shaft is prevented by a hydraulically releasable brake 233 comprising a cylindrical brake drum body 234 having an end portion corotatively secured to the actuator housing as by means of dowels 235 which secure it to the end member 230. Within the tubular opposite end portion of the brake drum housing 234 is mounted a massive spring washer 237 anchored at its outer margin to the drum body by means providing a spring fulcrum and herein comprising a captive snap ring 238 locked in the wall of the brake drum housing and seated within the outside corner of the spring washer outer margin, the outside perimeter of the spring washer being maintained in spaced relation to the brake drum housing member.

At its inner margin, the spring washer 237 engages in inwardly biasing brake locking thrusting engagement against a shoulder 239 on a tubular plunger 240 having on its inner end a radially extending and axially inwardly facing annular brake shoe flange 241 thrusting in braking reletion toward an annular brake disk flange 242 which, in turn, brakingly opposes an axially outwardly facing annular brake shoe surface 243 on the actuator housing end member 230. Improved brake locking action is attained by means of brake lining 244 which may be secured to the brake flange disk 242 or the opposing braking surfaces between which it is clamped. Corotative attachment of the brake disk flange 242 to the wing shaft 231 is through an integral hub 245 keyed to the shaft as onto a splined end portion 246 on the shaft.

Hydraulic release of the brake 233 is effected by introduction of hydraulic fluid pressure through an inlet 247 entering intermediately through the perimeter of the brake drum housing 234 and communicating with a passage 248 opening through the face of an inner annular pressure-resisting flange 249 opposing the axially inner side of the biasing spring washer 237 and defining therewith a pressure chamber 250. At its inner edge, the partition flange 249 slidably opposes the brake shoe plunger 240, with a dynamic seal 251 in the joint preventing leakage from the pressure chamber 250. At the outer side of the spring ring washer 237, the pressure chamber 250 is closed by a closure ring 252 engaged about the outer end portion of the plunger 240 and retained by a ring nut 253. A static ring seal 254 prevents leakage through the joint between the closure ring 252 and the plunger 240. At its outer perimeter, the closure ring 252 opposes the inner perimeter wall of the brake drum housing member 234, with a sealing ring 255 preventing leakage at this joint. Through this arrangement, hydraulic pressure introduced into the chamber 250 causes sufficient resilient yielding of the heavy spring washer 237 about its fulcrum to unlock the brake and permit relative rotary operating movements of the actuator housing and wing shaft.

From the foregoing, it will be apparent that in all forms of the invention, means are provided externally of the housing of the hydraulic rotary actuator and corotative therewith providing a first braking surface, while the wing shaft of the actuator has corotative therewith a braking surface opposing and normally lockingly engaged with the first braking surface, whereby to hold the housing and shaft against relative rotary movement. Further, in all forms of the invention, means are provided for introducing hydraulic pressure into releasing relation between, and to relieve the locking engagement of, the braking surfaces to enable relative rotary movements of the housing and shaft. Accordingly, a positive fail-safe locking brake is afforded in each embodiment of the invention.

It will be understood that modifications and variations may be effected without departing from the scope of the novel concepts of the present invention.

We claim as our invention:

1. A rotary actuator of the character described including a housing and a rotary shaft journalled in said housing and having a portion thereof extending beyond one end of the housing:
   an annular brake drum structure mounted on and corotative with and including a portion projecting from said one end of the housing in spaced concentric relation about said portion of the shaft;
   a brake disk mounted corotatively on said projecting portion of the shaft and axially adjustable relative thereto;
   opposed generally axially facing complementary braking surfaces on said disk and said brake drum structure;
   means for axially adjusting said brake disk for adjustably thrusting said surfaces into locking engagement normally holding said housing and shaft against relative rotary movement; and
   means for hydraulically releasing said surfaces to enable said relative rotary movement.

2. A rotary actuator as defined in claim 1, in which said adjusting means comprise an axially movable part of said brake disk and a set of draw-up bolts acting thereon.

3. In a hydraulic rotary actuator construction including a housing defining a working chamber having abutment means therein and a wing saft journalled in said housing and having vane means in said chamber cooperatively related to said abutment means to effect relative oscillations of the housing and the shaft responsive to hydraulic pressure in the chamber:
   one end portion of the shaft extending beyond one end of the housing;
   a brake drum corotatively attached to the housing and projecting in concentric spaced relation about said shaft end portion;
   brake shoe means corotatively mounted on said shaft end portion and normally lockingly engaging said brake drum;
   means for hydraulically releasing said brake shoe means and brake drum to enable relative rotary movements of the housing and shaft;
   said brake shoe means comprising a pair of brake shoe members; and
   means for adjusting said members relative to each other and to said brake drum to vary the locking engagement pressure between the brake drum and brake shoe members.

4. In a hydraulic rotary actuator construction including a housing defining a working chamber having abutment means therein and a wing shaft journalled in said housing and having vane means in said chamber cooperatively related to said abutment means to effect relative oscillations of the housing and the shaft responsive to hydraulic pressure in the chamber:
   one end portion of the shaft extending beyond one end of the housing;
   brake drum means corotatively attached to the housing and projecting in concentric spaced relation about said shaft end portion;
   brake shoe means corotatively mounted on said shaft end portion and normally lockingly engaging said brake drum means;
   means for hydraulically releasing said brake shoe means and said brake drum means to enable relative rotary movements of the housing and shaft;
   one of said brake drum and shoe means comprising a pair of members; and
   means for adjusting said pair of members relative to each other and to the other of said means to vary the locking engagement pressure between the brake drum means and the brake shoe means.

5. In combination in a hydraulic rotary actuator including a housing defining a working chamber having abutment means therein and a wing shaft journalled in said housing and having vane means in said chamber cooperatively related to said abutment means to effect relative oscillations of the housing and shaft about an axis responsive to hydraulic pressure in the chamber:
   brake means externally of said housing and fixedly corotative therewith providing a first braking surface which faces at least partially in generally axial direction;
   an annular structure corotative with but axially shiftably mounted on said shaft and providing a braking surface complementary to and opposing and normally lockingly engaged with said first braking surface whereby to hold said housing and shaft against relative rotary movement;
   means for introducing hydraulic pressure into releasing relation between said brake means and said annular structure to relieve the locking engagement of said braking surfaces to enable relative rotary movements of the housing and shaft; and
   means for selectively adjusting said annular structure axially relative to said brake means along said shaft to adjust the pressure with which said braking surfaces lockingly engage.

6. An actuator as defined in claim 5, in which said annular structure comprises axially facing spaced flange means, and screws extending between and adjustably relatively moving said flange means to effect said selective adjusting of the annular structure.

7. An actuator as defined in claim 5, in which said annular structure comprises a pair of spaced flanges, said flanges and said brake means having the braking surfaces thereof frusto-conically tapered in intersecting planes and said selective adjusting means adjusting said flange means with respect to each other, with respect to said shaft, and with respect to said brake means.

8. An actuator as defined in claim 5, in which said housing has an end closure, said shaft extending through and beyond said end closure, said brake means comprise an annular drum mounted on and projecting as an extension from said end closure in coaxial spaced relation about the projecting portion of the shaft, and said annular structure operates within said brake drum.

9. In combination in a rotary actuator of the character described comprising relatively rotary members:

a brake drum structure on and projecting corotatively from one of said members;

brake shoe means on and corotative with the other of said members;

said brake drum structure and said brake shoe means having complementary generally axially facing braking surfaces which are normally lockingly engaged;

means for hydraulically releasing said braking surfaces;

said brake drum structure comprising a pair of relatively adjustable members having axially opposed normally spaced apart flange portions; and means securing said flange portions together and operative to effect relative axial adjustment between said members for adjusting the locking braking pressure between said braking surfaces.

10. A rotary actuator as defined in claim 9, in which said one member comprises an actuator housing and said other of said members comprises a shaft, journaled in said housing and projecting therefrom, said brake drum structure comprises an extension on and from said housing concentrically about the projecting portion of the shaft member, said brake shoe means being encompassed by said brake drum structure.

11. A rotary actuator as defined in claim 9, in which said one member is a shaft and the other of said members is a housing within which the shaft is journaled and from which a portion of the shaft projects, one of said pair of relatively adjustable members including a generally radially extending flange portion which is co-rotatively mounted on the projecting portion of the shaft, said brake shoe means comprising a body member of the housing on which the braking surface is of low pitch frusto-conical form on the outer perimeter of the body member, the other of said relatively adjustable members being of annular form and engaged about said body member, one of said relatively adjustable members and said body member having confronting annular thrust portions cooperative in respect to said relative axial adjustment.

12. A rotary actuator as defined in claim 11 in which said thrust portion on the body member comprises a stop shoulder.

13. A rotary hydraulic actuator as defined in claim 11, in which said thrust portions comprise respective low pitch frusto-conical braking surfaces which are disposed in intersecting relation to and extend from said first mentioned braking surfaces.

References Cited

UNITED STATES PATENTS

| | | | |
|---|---|---|---|
| 1,774,144 | 8/1930 | Jones | 188—130 |
| 2,741,702 | 4/1956 | Keen | 92—121 X |
| 2,778,344 | 1/1957 | Compton et al. | 91—45 |
| 2,893,519 | 7/1959 | Martin | 92—28 X |
| 2,927,669 | 3/1960 | Walerowski | 253—59 |
| 3,017,807 | 1/1962 | Grover | 92—15 X |
| 3,028,619 | 4/1962 | Schlage et al. | 188—130 X |
| 3,033,175 | 5/1962 | Stott | 92—27 X |
| 3,150,571 | 9/1964 | Frassetto et al. | 92—28 |
| 3,179,018 | 4/1965 | Rumsey | 92—28 |
| 3,203,513 | 8/1965 | Allen | 92—28 X |
| 3,262,522 | 7/1966 | Johnson et al. | 188—130 |
| 3,267,818 | 8/1966 | Chambers | 92—17 |
| 3,286,602 | 11/1966 | Butner et al. | 92—28 |

MARTIN P. SCHWADRON, *Primary Examiner.*

I. C. COHEN, *Assistant Examiner.*